(12) United States Patent
Steuer et al.

(10) Patent No.: US 6,710,485 B2
(45) Date of Patent: Mar. 23, 2004

(54) MACHINE HOUSING

(75) Inventors: Peter Steuer, Karlsruhe (DE); Dariusz Schneider, Rheinmuenster (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/134,730

(22) Filed: Apr. 30, 2002

(65) Prior Publication Data

US 2002/0163269 A1 Nov. 7, 2002

(30) Foreign Application Priority Data

May 4, 2001 (DE) .......................... 101 21 769

(51) Int. Cl.[7] .............................. H02K 5/16; H02K 7/08
(52) U.S. Cl. .............................. 310/89; 310/90; 310/91
(58) Field of Search ..................... 384/295; 310/89, 310/90, 91

(56) References Cited

U.S. PATENT DOCUMENTS

| | | | |
|---|---|---|---|
| 3,624,434 A | * 11/1971 | Dafler et al. | 310/60 R |
| 4,017,127 A | * 4/1977 | Smith et al. | 384/294 |
| RE32,764 E | * 10/1988 | Smith et al. | 384/275 |

(List continued on next page.)

FOREIGN PATENT DOCUMENTS

| | | | |
|---|---|---|---|
| DE | 413 393 | 5/1925 | |
| DE | 000067328 | * 12/1982 | ............ H02K/5/15 |
| DE | 36 35 987 C2 | 10/1986 | |
| DE | 3 805 402 A1 | 2/1988 | |
| EP | 0 471 876 A1 | 8/1990 | |
| FR | 2673449 | * 9/1992 | .......... H02K/5/167 |
| GB | 1 588 660 | 5/1978 | |
| GB | 2317505 | * 3/1998 | .......... H02K/5/167 |
| JP | 07184339 | * 7/1995 | ............ H02K/5/00 |
| JP | 11164509 | * 6/1999 | ............ H02K/5/16 |
| JP | 2002084727 | * 3/2002 | ............ H02K/21/22 |
| KR | Derwent 200176 | * 12/1999 | ............ H02K/5/04 |

Primary Examiner—Thomas M. Dougherty
Assistant Examiner—H. Elkassabgi
(74) Attorney, Agent, or Firm—Ronald E. Greigg

(57) ABSTRACT

In a machine housing of the prior art, the bearing plate must be secured to the tubular element by means of one additional assembly step. In a machine housing of the invention, the bearing plate is secured in the tubular element by pressure, and simultaneously an axial play of a shaft in the machine housing can be adjusted.

6 Claims, 4 Drawing Sheets

U.S. PATENT DOCUMENTS

| | | | | |
|---|---|---|---|---|
| 4,800,309 A | * | 1/1989 | Lakin | 310/90 |
| 4,887,916 A | * | 12/1989 | Adam et al. | 384/192 |
| 4,910,424 A | * | 3/1990 | Borcherding | 310/90 |
| 4,924,127 A | * | 5/1990 | Boireau et al. | 310/90 |
| 4,967,111 A | * | 10/1990 | Andrieux et al. | 310/90 |
| 4,989,998 A | * | 2/1991 | Willis et al. | 384/275 |
| 5,006,747 A | * | 4/1991 | Stewart, Sr. | 310/239 |
| 5,019,732 A | * | 5/1991 | Spiesser | 310/49 R |
| 5,113,104 A | * | 5/1992 | Blaettner et al. | 310/90 |
| 5,128,574 A | * | 7/1992 | Koizumi et al. | 310/90 |
| 5,184,039 A | * | 2/1993 | Kraft | 310/89 |
| 5,218,256 A | * | 6/1993 | Umezawa et al. | 310/90 |
| 5,258,672 A | * | 11/1993 | Wrobel | 310/42 |
| 5,267,797 A | * | 12/1993 | Brandt | 384/275 |
| 5,291,089 A | * | 3/1994 | Snider et al. | 310/90 |
| 5,298,822 A | * | 3/1994 | Bosman et al. | 310/49 R |
| 5,358,341 A | * | 10/1994 | Blaettner et al. | 384/204 |
| 5,405,199 A | * | 4/1995 | Mabuchi et al. | 384/204 |
| 5,661,357 A | * | 8/1997 | Iijima | 310/239 |
| 5,677,585 A | * | 10/1997 | Ida et al. | 310/91 |
| 5,788,210 A | * | 8/1998 | Mimura | 248/672 |
| 5,798,589 A | * | 8/1998 | Ohi et al. | 310/90 |
| 5,818,133 A | * | 10/1998 | Kershaw et al. | 310/67 R |
| 5,821,646 A | * | 10/1998 | Chuta et al. | 310/67 R |
| 5,822,179 A | * | 10/1998 | Yu | 361/600 |
| 5,836,699 A | * | 11/1998 | Back et al. | 384/276 |
| 5,872,414 A | * | 2/1999 | Iijima | 310/89 |
| 5,945,757 A | * | 8/1999 | Yu | 310/89 |
| 5,977,673 A | * | 11/1999 | Iwata | 310/90 |
| 6,008,557 A | * | 12/1999 | Dornhoefer et al. | 310/90 |
| 6,040,649 A | * | 3/2000 | Horng | 310/91 |
| 6,124,656 A | * | 9/2000 | Jensen | 310/89 |
| 6,300,695 B1 | * | 10/2001 | Neal | 310/68 D |
| 6,316,857 B1 | * | 11/2001 | Jeong | 310/90 |
| 6,336,745 B1 | * | 1/2002 | Horng et al. | 384/279 |
| 6,351,047 B1 | * | 2/2002 | Hanneken | 310/90 |
| 6,376,952 B1 | * | 4/2002 | Stenta | 310/90 |
| 2002/0140306 A1 | * | 10/2002 | Schuller et al. | 310/91 |

* cited by examiner

MACHINE HOUSING

BACKGROUND OF THE INVENTION

1. Field of the Invention

The invention is directed to an improved housing for a machine such as an electric motor or generator.

2. Description of the Prior Art

From U.S. Pat. No. 5,661,357, a machine housing is known in which a fastening element is embodied integrally with a bearing plate and secures the bearing to the bearing plate. However, the individual housing parts of the machine housing, including among others the bearing plate, are joined together by means of a screw.

From U.S. Pat. No. 5,184,039, it is known to secure a bearing plate with a bearing in a tubular element in such a way that the axial play of a shaft is adjusted in a targeted way. The fastening of the bearing plate to the tubular element is accomplished by a separate work step, such as ultrasonic welding, after the installation. Moreover, the bearing is retained in the bearing plate by means of an additional fastening spring.

OBJECT AND SUMMARY OF THE INVENTION

The machine housing of the invention has the advantage over the prior art that a bearing plate is secured to a tubular element in a simple way.

It is advantageous to manufacture the bearing plate of spring steel, because this strengthens the fastening by means of pressure in the tubular element.

It is advantageous for a fastening element that secures a bearing to the bearing plate to be embodied integrally with the bearing plate, because additional fastening means are then omitted.

If the bearing plate has a sharp stamped edge on its outer circumference, then good fastening between the bearing plate and the tubular element is possible.

It is also advantageous if the bearing plate has recesses on its edge, that is, notches, because the stiffness of the bearing plate can advantageously be varied as a result.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1A:
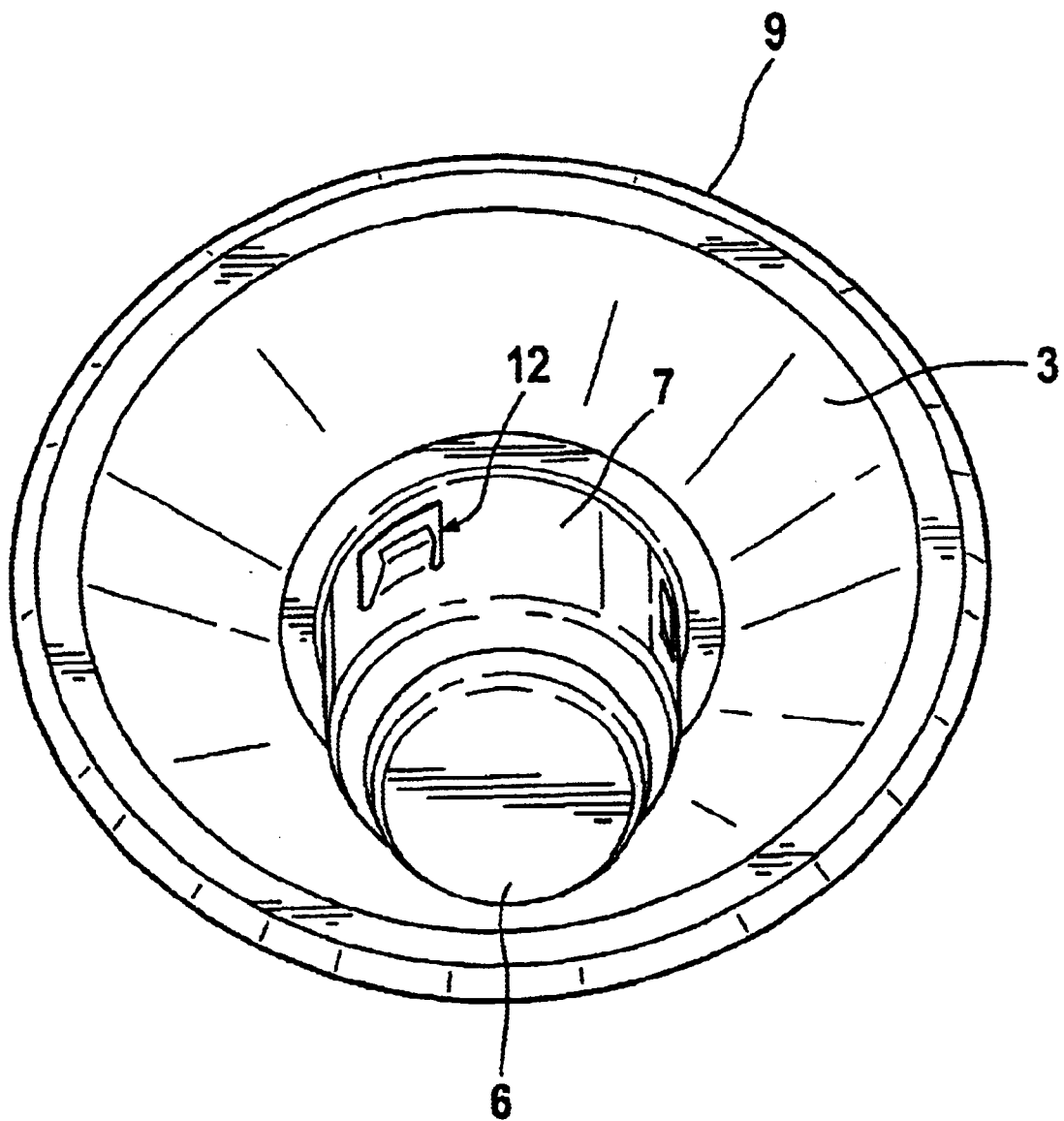
FIG. 1a shows a first bearing plate, FIG. 1b a second bearing plate, and FIG. 1c a third bearing plate for a machine housing of the invention.

FIG. 1a shows a first bearing plate 3 for a machine housing 1 (FIG. 2) of the invention. The bearing plate 3 has a caplike shape, for instance, and a bulge 6, which for instance is cup-shaped, is embodied centrally on the bearing plate 3, and a bearing 15 (FIG. 2) is disposed in this bulge.

The bearing plate 3 is produced from spring steel, for instance, and is similar to a securing loop, and the thickness of the bearing plate 3 depends on its use. The bearing plate 3 has an outer circumferential line 9, which for instance is embodied as sharp-edged, of the kind that occurs for instance in the stamping process for producing the bearing plate 3.

Fastening elements 12, for instance three in number, are present in the bulge 6 and are for instance embodied integrally with the bearing plate 3 in order to hold the bearing 15 on the bearing plate 3 in the bulge 6. However, an additional securing ring can also be used for fastening the bearing 15.

The fastening element 12 is embodied for instance as a spring tab that is cut out of the wall of the bulge 6 and protrudes into the bulge 6.

Figure 1B:
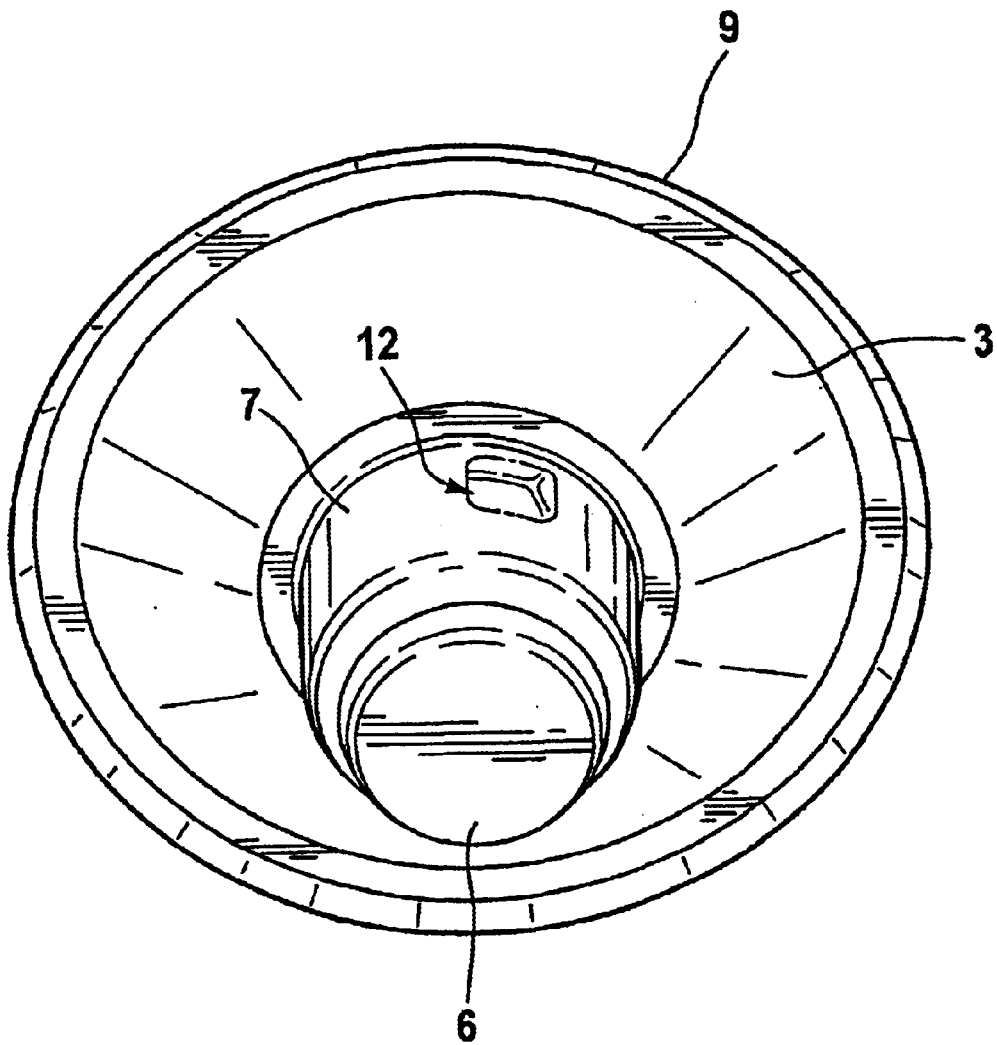

FIG. 1b shows a second bearing plate 3. If the bearing plate 3 is meant to seal off a tubular element 18 (FIG. 2) in waterproof fashion, then the fastening element 12 embodied integrally with the bearing plate 3 is for instance produced by pressing in on an outer face 7 of the bulge 6. The fastening element 12 thus created provides a protrusion that protrudes into the bulge 6 and can then hold the bearing 5 in the bulge 6.

Figure 1C:
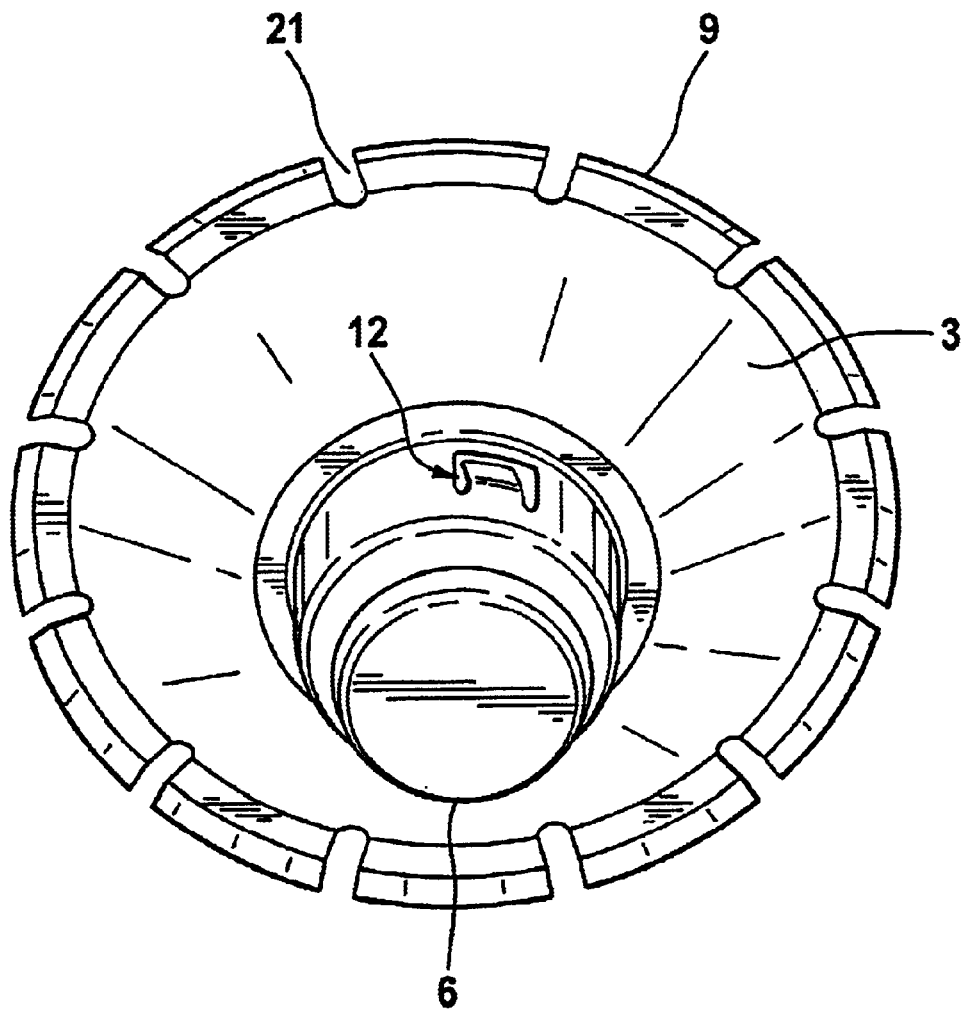

FIG. 1c shows a third bearing plate 3. In comparison to FIG. 1a, the bearing plate 3 on its circumferential line 9 has at least one recess 21, embodied for instance as a notch, as a result of which the mechanical stiffness of the bearing plate 3 can be varied in a targeted way so that the requisite force for the pressing together of the bearing plate 3 and tubular element 18 can be adjusted.

Figure 2A:
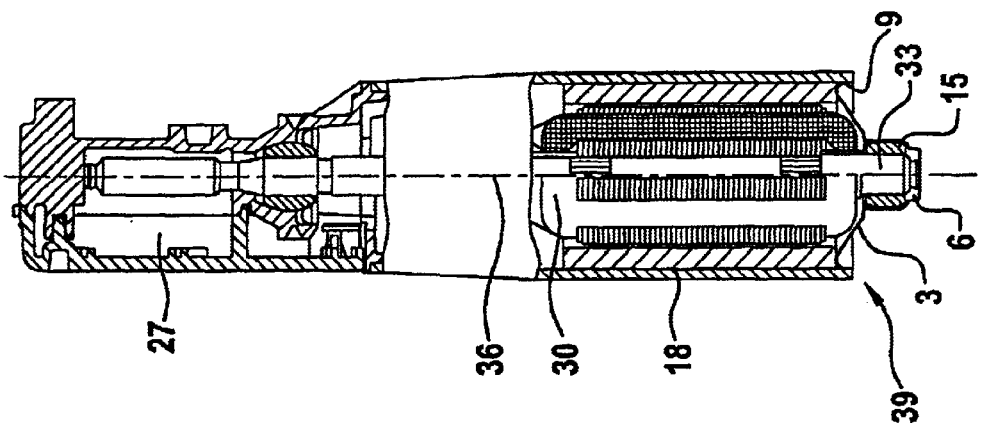
FIGS. 2a, 2b, and 2c show assembly steps for a machine housing of the invention.

FIG. 2a shows a machine housing 1 of the invention before assembly. The machine housing 1 is used for instance for an electrical machine, such an electric motor or an electric generator or an electric adjusting mechanism.

In the bearing plate 3, the bearing 15 is secured prior to mounting to the tubular element 18 of the machine housing 1. The fastening elements 12 grip the bearing 15 around an outer face and thus retain the bearing 15 in the bulge 6.

Magnets 24 are disposed in the tubular element 18. For instance, the tubular element 18 forms a magnetic short-circuit element for an electrical machine. The bearing plate 3 is secured on one axial end 39 of the tubular element 18 by being thrust into the interior of the tubular element. Secured on the other end is a gear unit 27, for instance, with a further bearing, a gear, and additionally an electronic device, for instance.

Figure 2B:
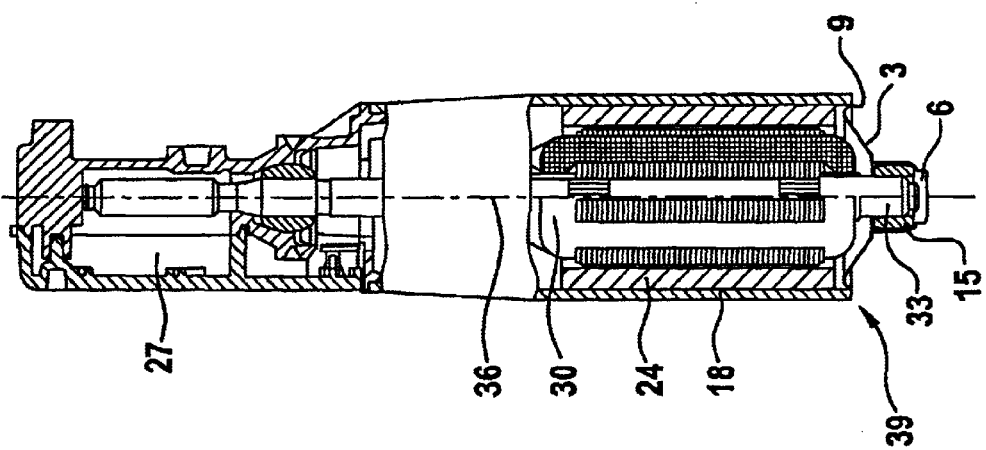
Figure 2C:
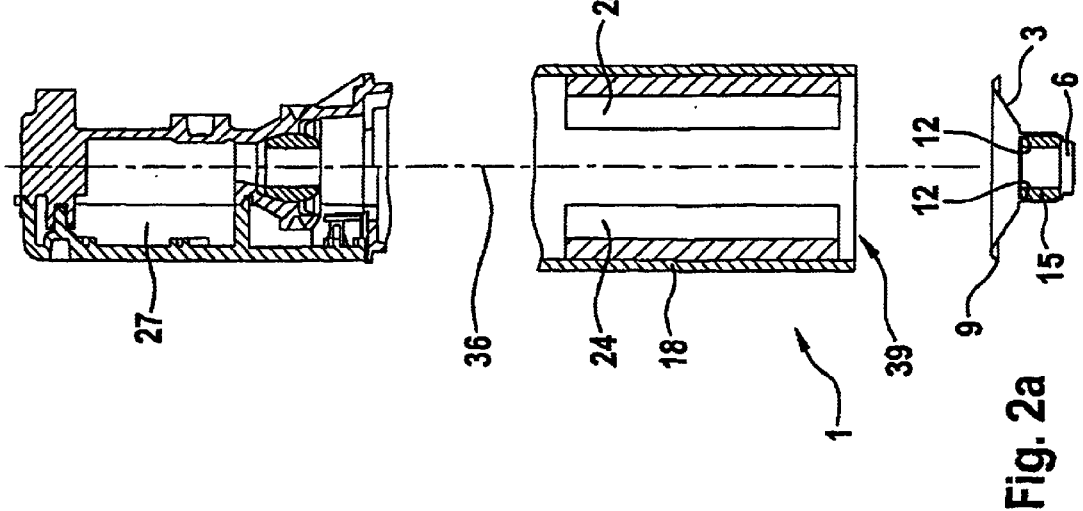

FIG. 2b shows a machine housing 1 of the invention in a nearly completely assembled state. In the tubular element 18, an armature 30, for instance, is also disposed, having a lamination packet or magnets and a shaft 33. The shaft 33 is supported in the bearing 15. The bearing 15 is a ball bearing or a spherical-cap bearing.

The gear unit 27 is secured to the tubular element 18 in a further assembly step. The shaft 33, after assembly of the gear unit 27 or of some other component that closes off the tubular element 18 on the other axial end, can still have an axial play, which is to be adjusted in a controlled way.

This is accomplished by inserting the bearing plate 3 into the tubular element 18 so far in an axial direction 36 that the desired axial play of the shaft 33 is established.

The shape and the material of the bearing plate 3 assure a firm seat, after it has been press-fitted into place, by means of a positive and/or nonpositive engagement as a consequence of elastic and plastic deformation of the bearing plate 3 and of the inner wall of the tubular element 18. If the bearing plate 3 furthermore has a circumferential line with a sharp edge, then this circumferential line 9 digs firmly into the tubular element 18 in the desired way.

The foregoing relates to preferred exemplary embodiments of the invention, it being understood that other variants and embodiments thereof are possible within the spirit and scope of the invention, the latter being defined by the appended claims.

What is claimed is:

1. A machine housing, in particular for an electrical machine, comprising
    a bearing plate having a sharp edge extending in a circumferential line on its outer periphery,
    a bearing that is disposed in the bearing plate,
    a tubular element,
    the bearing plate being secured to the tubular element and cooperating therewith to form a machine housing, and
    a shaft that is disposed in the machine housing,
    the bearing plate being secured in the tubular element in such a way that an axial play of the shaft in the machine housing maybe adjusted in a controlled fashion,
    the bearing plate (3) being secured in the tubular element (18) by pressure and positive engagement in which the sharp edge digs into the tubular element.

2. The machine housing according to claim 1 wherein
    the bearing plate (3) is of spring steel.

3. The machine housing according to claim 1 further comprising
    at least one fastening element (12) integrally formed on the bearing plate (3), the at least one fastening element securing the bearing (15) to the bearing plate (3).

4. The machine housing according to claim 3 wherein
    the bearing plate (3) has recesses (21) formed along its outer periphery (9).

5. The machine housing according to claim 1 wherein
    the bearing plate (3) has recesses (21) formed along its outer periphery (9).

6. The machine housing according to claim 1 wherein
    the machine housing (1) is a pole housing of an electrical machine.

* * * * *